March 20, 1962     J. R. NELSON     3,025,562
APPARATUS FOR FORMING AND TRIMMING PLASTIC ARTICLES
Filed Oct. 16, 1958     3 Sheets-Sheet 2
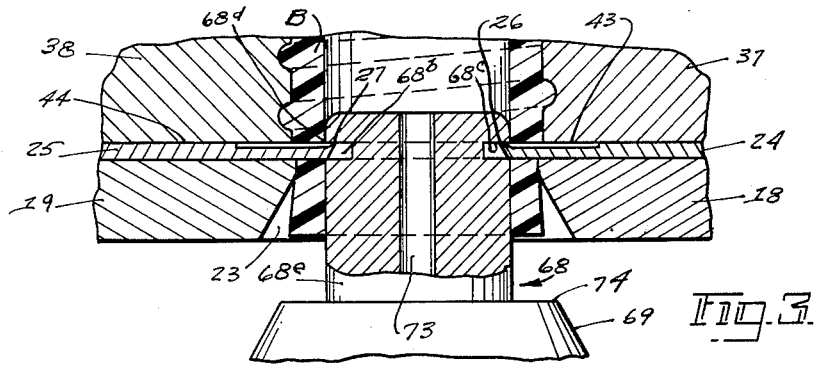
Fig. 3.
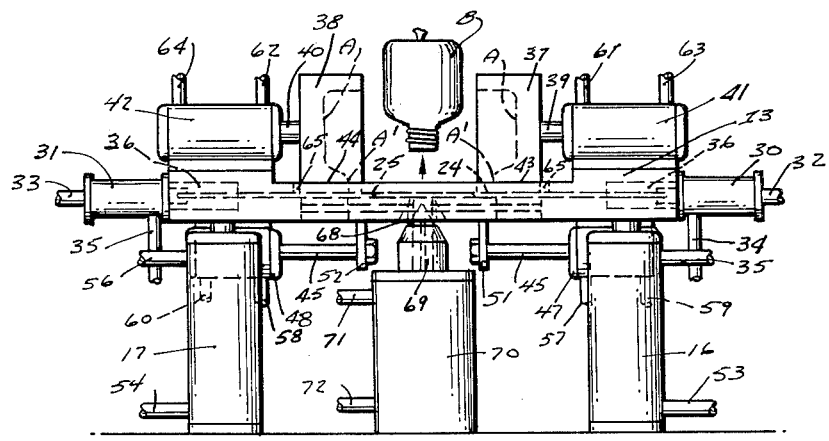
Fig. 4.
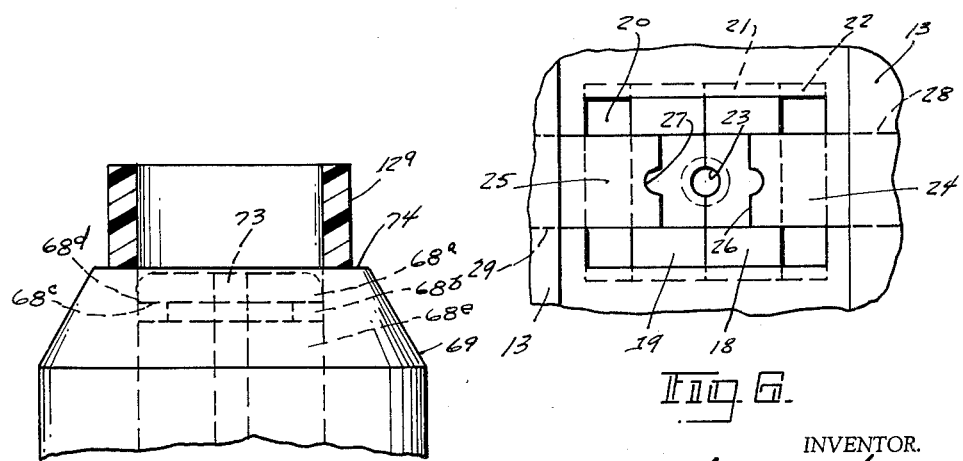
Fig. 5.
Fig. 6.
INVENTOR.
JOHN R. NELSON
BY
ATTORNEYS March 20, 1962  J. R. NELSON  3,025,562
APPARATUS FOR FORMING AND TRIMMING PLASTIC ARTICLES
Filed Oct. 16, 1958  3 Sheets-Sheet 3
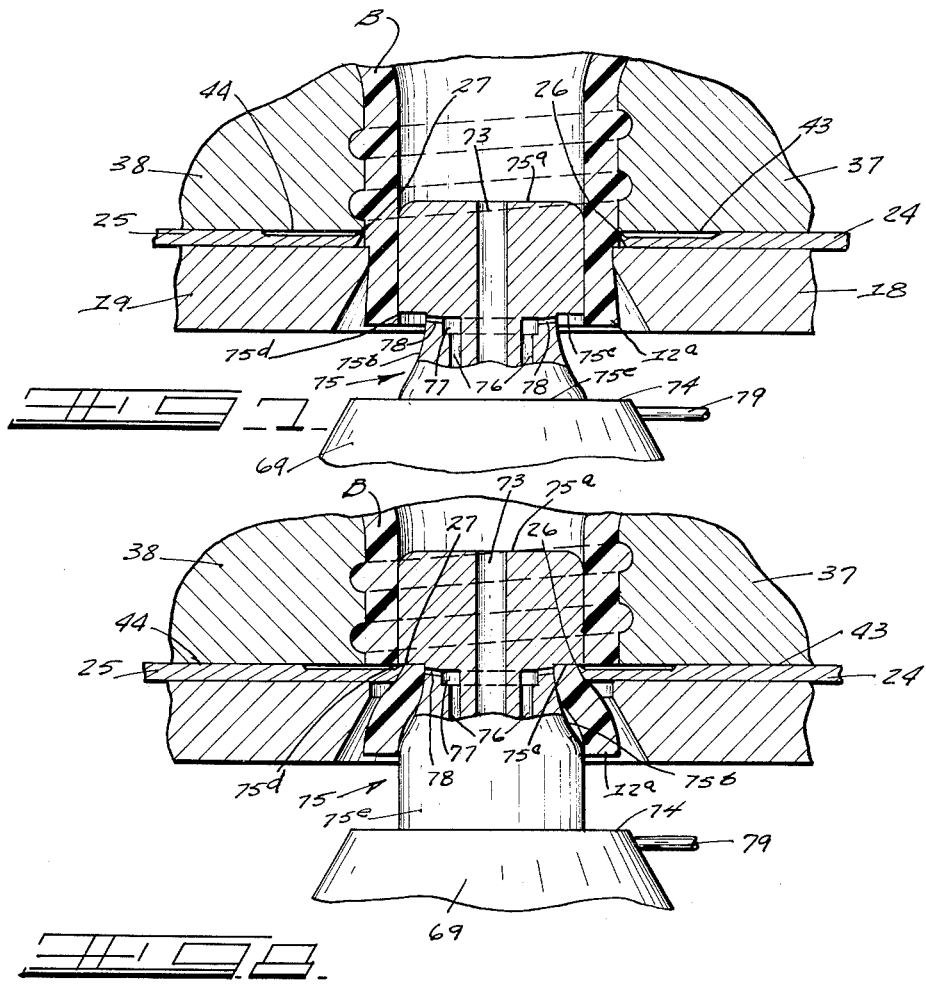
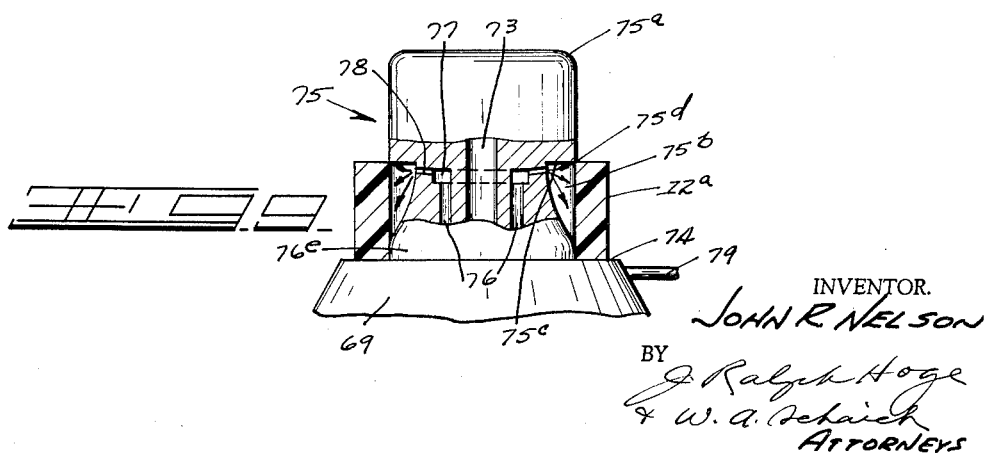
INVENTOR.
JOHN R NELSON
BY United States Patent Office 3,025,562
Patented Mar. 20, 1962

3,025,562
APPARATUS FOR FORMING AND TRIMMING
PLASTIC ARTICLES
John R. Nelson, Toledo, Ohio, assignor to Owens-Illinois
Glass Company, a corporation of Ohio
Filed Oct. 16, 1958, Ser. No. 767,635
2 Claims. (Cl. 18—5)

The present invention relates to the manufacture of hollow plastic articles from heated extruded organic plastic tubing, and particularly to blown articles made by expanding such heated plastic tubing to the shape of a molding cavity of a mold. In some of the presently known similar processes, it is necessary to form the container from a length of such heated plastic tubing that is in excess of the length expanded to the shape of the article. In such a process, it is necessary to trim one or both ends of the blown article after it is removed from the molding apparatus.

The present invention has as one of its objects improved apparatus for trimming at least one end of the blown article at an opening of the article and while still in the mold.

Another object of the invention is to provide trimming at least one end of the blown article by a shearing action on the tubing while the article is in the mold, this shearing action being in the end face of the mold at the opening of its molding cavity, and yet to maintain the opening of the molded plastic article to size by supporting the plastic in the mold about the opening of the article.

Another object of the invention is the provision of such trimming for a blown plastic article while in the mold that lends itself to automatic forming machine operation so as to be performed in succession and with uniformity to produce molded articles at a high rate.

Still another object of the invention is to finish the bore of the opening of the plastic article after it is blown to shape.

Still further objects and advantages of the invention will become apparent from the following detailed description of the accompanying drawings on which, by way of preferred example, is presented illustrative forms of the invention to explain its principles and practical adaptation.

On the drawings:

FIG. 3 is an enlarged fragmentary view, in section, showing the relationship of the end of the tubing and the mandrel at the blowing position of FIG. 2 and illustrates the trimming step of the process for trimming excess plastic tubing at the open end of the article subsequent to expanding the tubing in the mold.

FIG. 4 is a front elevational view of the machine similar to FIG. 2, and illustrates an advanced stage of the process shown unloading a finished article.

FIG. 5 is a front elevational view, partly in section, of the mandrel carriage and cooperating stripper member, and illustrates the step of stripping the trimmed plastic from the mandrel.

FIG. 6 is a plan view of the movable cutting members mounted for sliding movement in the top of the mold bed and is taken along line 6—6 of FIG. 2.

FIG. 7 is an enlarged fargmentary view similar to FIG. 3, and illustrates a modified form of mandrel inserted into mold opening through the end of the tubing and shows the end of the tubing subsequent to expanding the tubing in the molding cavity, but prior to trimming.

FIG. 8 is a view similar to FIG. 7, illustrating the steps for sizing the interior of the opening of the article by the modified mandrel and trimming the excess plastic tubing from the end face at the open end of the molded article.

FIG. 9 is a fragmentary view, partly in section, similar to FIG. 5, showing the modified form of the invention for stripping the trimmed excess plastic tubing from the mandrel.

Figures 1, 2:
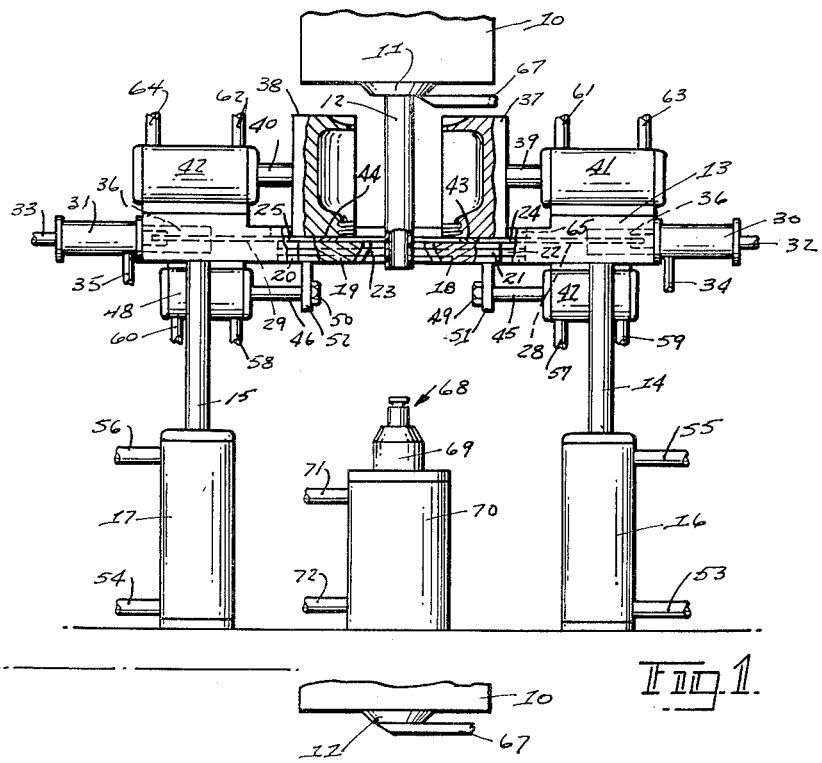
FIG. 1 is a front elevational view, partly in section, of one form of machine for carrying out the method of the invention and includes the novel mandrel apparatus of the invention. The machine is shown in loading position at an initial stage of the cycle for blow forming an article from extruded heated organic plastic tubing.
FIG. 2 is a similar front elevational view of the machine of FIG. 1, showing a severed length of tubing enclosed in the mold and moved to a remote position relative to the extruder to a blowing position ready to expand the tubing to the shape of a molded article.

Referring to the drawings, a preferred form of the present invention will now be described.

In FIGS. 1 and 2, an extruder 10 has a downwardly directed orifice 11 capable of issuing hollow tubing 12 of any suitable organic plastic material in heated condition and capable of expansion and then setting to shape upon cooling. There is a wide range of such materials presently offered on the commercial market, for example, commercial grades of polyethylene. The extruder may be of any well-known type capable of continuous operation in which a pressure screw performs the operation of plasticizing the organic plastic material by the application of heat and pressure. The thus heated plasticized material is continuously extruded in a hollow tubular form 12.

The molding apparatus comprises a mold bed 13 which is mounted on piston rods 14 and 15 of fluid pressure actuated vertically reciprocable motors 16 and 17, respectively, and operable for vertical movement toward and away from the extruder orifice 11. The central portion of the mold bed 13 is shown as being provided with a pair of tube holding members 18 and 19 slidably mounted in horizontal ways in the mold bed for movement toward and away from each other between open and closed positions. For example, the tube holding members 18 and 19 are shown shiftably mounted in a central opening 20 of mold bed 13 (FIG. 6) and are held at the side margins thereof by projecting side tongues 21 integral on opposite sides of said holding members 18 and 19 fitted and in corresponding grooves 22 along the margins of the mentioned central opening 20 (FIG. 6). This apparatus is fully disclosed in my copending application, Ser. No. 765,494, filed October 6, 1958, and is utilized to provide a variable width aperture 23. Another form of apparatus having a non-variable or uniform size aperture is disclosed in the copending application of W. A. Schaich, Ser. No. 756,576, filed August 22, 1958, entitled "Method and Apparatus for Forming Hollow Plastic Articles," and owned by the assignee of the present application. The present invention is also readily adaptable to this latter-mentioned form of bottle blowing machine.

In the present invention, a pair of opposed cutting elements 24 and 25 are mounted for sliding movement in a plane parallel with the mold bed 13 and are shown slidable along the top surface of the tube holding members 18 and 19. The opposed edges of these elements 24 and 25 are knife sharp at their respective edges 26 and 27. The central portion of edges 26 and 27 are semi-circular in configuration so that when they are shifted toward each other to their limit, they define a central circular space therebetween and the straight portions of these edges outwardly of the circular space lie parallel to each other and are in contact (see FIG. 6). The cooperating function of these cutting elements with a mandrel will become apparent in connection with the manipulation of the latter in the trimming step, and will be presently explained more in detail.

Cutting elements 24 and 25 are mounted for sliding movement in slots or ways 28 and 29 in the mold bed 13 which serve to guide these elements in a plane that is along the top of the holding members 18 and 19. The elements 24 and 25 are each detachably connected to the piston rod of horizontally reciprocating fluid pressure actuated motors, numbered 30 and 31, respectively. These motors are each connected to a suitable fluid system to receive pressurized fluid at their ports 32 and 33 while exhausting fluid at ports 34 and 35 to move the cutting elements 24 and 25 toward each other, and, when the ports 32 and 33 are connected for exhausting fluid and ports 34 and 35 connected for receiving pressurized fluid, these cutting elements will be moved away from each other (FIG. 6). The motors 30 and 31 are mounted at the sides of mold bed 13 and the portion of the piston rods projecting from each motor will reciprocate in a hollow section 36 at the sides of mold bed 13.

A pair of partible mold sections 37 and 38 are mounted on piston rods 39 and 40, respectively, of the horizontally reciprocating fluid pressure actuated motors 41 and 42. The motors 41 and 42 are rigidly connected near the side margins at the top side of the mold bed 13 and are operable to actuate the partible mold sections 37 and 38 toward and away from each other between open and closed positions of the mold concentric to the extruded tube 12. These mold sections 37 and 38, when closed, define a molding cavity A (FIG. 2) corresponding to the configuration of the desired plastic article and including an end opening A' of the mold cavity A. The lower faces or surfaces 43 and 44 of the mold sections 37 and 38 are in abutting relationship at the top side of the cutting elements 24 and 25. Thus, the cutting elements are sandwiched in between the lower faces 43 and 44 of the mold sections and the top surface of the movable tube holding members 18 and 19.

The movable tube holding members 18 and 19 are detachably connected to the piston rods 45 and 46 of fluid pressure actuated reciprocating motors 47 and 48, the piston rods being inserted through aligned bores in downwardly depending brackets 51 and 52 and fastened by nuts 49 and 50 (FIG. 1), threaded on the outer ends of piston rods 45 and 46, respectively. These brackets are rigidly connected at the underside of their respective tube holding members 18 and 19. The advantages to be obtained from the use of the mentioned holding members and the details of their operation are more fully set forth in my mentioned copending application.

These motors 47 and 48 control the lateral movements of the tube holding members for effecting the opening and closing movements of the latter and thereby effect varying the size of the aperture 23. As shown on FIG. 1, the two motors 47 and 48 are actuated so that the tube holding members 18 and 19 are separated and the aperture 23 is expanded to its largest size. When the tube holding members are separated, the aperture size is larger than the diameter of the tube 12, and thereby permits the free entry of the tube 12 as it is directed from the extruder orifice 11 into the aperture 23 when the mold bed 13 is moved to its uppermost position, hereafter called the "loading position" by the extension of the piston rods 14 and 15. In the arrangement shown on the drawings, the cavity A of the closed mold sections 37 and 38 defines a bottle configuration which is in inverted relationship so that the end or outermost face of the neck of the bottle will be disposed in the same plane as the bottom surfaces 43 and 44 of these mold sections.

The mold sections, as well as the holding members, may be provided with internal coolant passages for the circulation of coolant to cool these parts and influence the rate of cooling the plastic material contacted by these parts. This cooling expedient, which is well-known to those skilled in the art, and, hence, is not shown detailed on the drawings, will permit successive forming cycles of the machine to be carried on at high production rates.

When it is desired to initiate the cycle for forming a container, as illustrated on the drawings, fluid under pressure is supplied to the lower ports 53 and 54 of the motors 16 and 17 so as to move the mold bed 13 upwardly toward the orifice 11 until the mold bed is at the "loading position," as shown in FIG. 1. During this actuation, fluid is exhausted through ports 55 and 56, respectively, of the said motors 16 and 17. Prior to this upward movement of the mold bed 13, the fluid motors 47 and 48 have set the tube holding members 18 and 19 in their "open" position by the application of fluid under pressure at their ports 57 and 58 and fluid therein is exhausted from these motors at ports 59 and 60. Also, before this upward movement of the mold bed 13 takes place, the fluid motors 41 and 42 are connected to receive actuating fluid at their ports 61 and 62 and exhaust fluid from ports 63 and 64 so that they move the mold sections 37 and 38 to their "open" position.

These mold sections are laterally shiftable with respect to the mold bed 13, and may, if desired, be directly mounted on mold bed 13 for horizontal sliding movement with respect thereto. For example, each mold section 37 and 38 may slide in a depression or groove 65 defining horizontally the travel of these sections at the top surface of mold bed 13 to guide the lateral movements of the mold sections with respect to the mold bed.

With the mold bed in the loading position (FIG. 1), the holding members 18 and 19 and the mold sections 37 and 38 are each "open." A lower axial end portion 12a of tubing 12 will enter between the open mold sections and holding members, in that order. The motors 47 and 48 are then actuated by connecting pressurized fluid to their ports 59 and 60 and exhausting fluid from their ports 57 and 58 to close the holding members 18 and 19 so that the aperture 23 contracts to align and firmly hold the tubing 12 at its end portion 12a. If, during the extrusion, the alignment of this freely dependent tubing 12 deviates from the axis of orifice 11, the contracting of the aperture 23 will align the tubing 12 so that it is along the axis of the orifice 11 and concentric with respect to the open mold sections.

In the bottle configuration illustrated by mold cavity A (FIG. 2), the mold sections 37 and 38 define the mold cavity A in inverted relationship so that the end face of the neck of the desired bottle will be disposed in the same plane as the bottom surfaces 43 and 44 of the mold sections 37 and 38. Thus, the mold sections 37 and 38 are closed about a length of tubing 12 that is above the closed holding members 18 and 19. In closing the mold sections, their bottom faces 43 and 44 are disposed in a tight contiguous engagement with the top surface of the cutting elements 24 and 25.

In closing of the mold sections 37 and 38, the top edges of such mold sections achieve a pinching and sealing action at the top end of the length of the tubing 12 enclosed in such mold, such as indicated at 66 (FIG. 2).

Along with closing the mold sections 37 and 38, the tubing 12 is severed from the extruder. This is accomplished by a reciprocating knife element 67 which may be actuated by a suitable fluid operated reciprocable motor (not shown) to effect the desired severing movement at the proper time of the cycle. The severing is preferred to be accomplished so that the lowermost end of the pendent tubing 12 is left open.

As the tubing 12 is severed, or immediately thereafter, the mold bed 13 and closed mold sections 37 and 38 are moved downwardly relative to the orifice 11 and at a speed greater than the extrusion rate of the oncoming tubing so as to space apart the severed ends of the tubing and permit the extruder 10 to operate continuously. By so doing, the extruder will issue a successive length of tubing while the molding apparatus is performing the hereinafter described blowing and trimming operations for forming the bottle.

Mold bed 13 is moved down to the "blowing position" by motors 16 and 17 which operate in unison. The mentioned blowing position of mold bed 13 is shown in FIG. 2.

A mandrel 68 is provided in axially aligned relationship with the open end of the tubing 12a held by the closed holding members 18 and 19 in the contracted aperture 23. The mandrel is preferably cylindrical at its head end to define the bore at the open end of the container B to be subsequently formed from the tubing 12 by blowing. The blowing step will be described hereinafter. The mandrel 68 may be of substantially the same diameter as the internal bore of the tubing or of a lesser diameter, however, if the diameter of tubing 12 is initially larger than the mandrel, the closing of the mold sections 37 and 38 will reduce the internal bore of the tubing at the opening A' of the molding cavity A to substantially the diameter of the mandrel 68. Furthermore, it is contemplated that the mandrel 68 may be carried with the mold bed 13 and yet actuated to reciprocate relative respect to the mold cavity opening.

The mandrel 68 is illustrated in cross section and in detail in FIG. 3, which demonstrates one form of novel apparatus of the invention. In this form, mandrel 68 has a cylindrical head end portion 68a and an intermediate annularly relieved portion or recess in the form of annular groove 68b. This groove 68b has a radially disposed wall or ledge 68c that terminates in a right angle corner along the periphery of the mandrel on the mentioned head end portion 68a. This corner defines an annular shearing edge 68d. Beyond the groove 68b is a cylindrical shank portion 68e of the mandrel which is reciprocally mounted in a housing 69. The mandrel 68 is reciprocated in and out of housing 69 by having its shank 68e operatively connected to fluid actuated reciprocating motor 70 (FIGS. 1, 2 and 4). Motor 70 receives and exhausts, alternatively, fluid at its ports 71 and 72 for providing reciprocating movement to mandrel 68.

The mandrel 68 is inserted into the tubing 12 through the open end of axial end portion 12a preferably by lowering the mold bed 13 to its lowermost position. At the time the mold bed is lowered, the mandrel 68 may be in its extended position (FIG. 1) so that the motors 16 and 17 move the closed mold sections relatively toward the mandrel and insert the head end portion 68a thereof into the tubing 12 in the opening A' of the molding cavity A to a point where the annular shearing edge 68d is aligned in the plane of the bottom faces 43 and 44 of the closed mold sections 37 and 38. This head end portion 68a of the mandrel will size the internal bore of the tubing 12 at the opening A'.

Alternatively, the mandrel 68 may be held withdrawn in its housing (position illustrated in FIG. 5) until the mold bed is lowered, and then the mandrel shifted to its extended position by its motor 70 so as to insert the head end portion 68a internally of the tubing in the mold opening A' (FIG. 3) and align its shearing edge 68d with the plane of the bottom faces 43 and 44 of the closed mold. Or, a substantially simultaneous combination of lowering movement of the mold bed 13 and extension of the mandrel 68 may be utilized for inserting the mandrel head end into the proper position with the tubing 12.

In either event, a blowing fluid is thereafter supplied under pressure through an axial passage 73 in mandrel 68 to expand the length of tubing in the closed mold to the configuration of the mold cavity A. This blowing fluid is supplied to axial passage 73 through the mandrel by any suitable connection thereto (not shown), preferably through the housing 69. When the mandrel 68 is extended, a valve (not shown) may be used to turn the blowing fluid "on" and "off" to achieve the desired duration and timing for applying blowing fluid to the mandrel 68 when the latter is extended. The fluid pressure for blowing is maintained by the mandrel 68 for a sufficient length of time to insure the expansion and setting of the plastic of the tubing to conform to the molding cavity A. Near the end of the blowing period and including time for allowing the plastic to cool and set to the self-supporting shape within the mold cavity, the axial end portion 12a of the expanded tubing is severed from the formed article by a radially inwardly directed cutting action applied in the plane of the bottom face of the partible mold sections 37 and 38. The previously-described cutting elements 24 and 25, which until time for trimming, have been separated, are moved toward each other by their motors 30 and 31. The knife sharp edges 26 and 27 of elements 24 and 25 pass through the wall of the tubing and across the annular shearing edge 68d of the mandrel and cleanly trim and form the end face of the opening of the finished article B. This trimming of excess plastic portion 12a by radially directed cutting action is clearly illustrated on FIG. 3.

During this cut or trim, the blowing fluid pressure applied through axial passage 73 for blowing is kept "on" in order to maintain a positive pressure within the blow article B in the mold so as to hold the expanded plastic tubing firmly against the walls of the mold cavity A and assist chilling or cooling it.

While the cutting elements 24 and 25 are moving into the wall of the plastic tubing to effect trimming the article, the mandrel head-end portion 68a then inside the tubing in the mold cavity opening A' will firmly hold the plastic thereat against movement or collapse and will maintain the opening of the article to finished size. The combination of the annular shearing edge 68d and the radially moved knife edges 26 and 27 cooperate to act as a shears on the wall of the plastic tubing 12 and the head end 68a of the mandrel holds the plastic enclosed within the molding cavity in place without slip or distortion. Also, as the knife edges 26 and 27 of the cutting elements 24 and 25 pass through the wall of the tubing, the material outwardly of the cutting plane (labeled portion 12a and representing the excess plastic trimmed from the formed bottle) will move downwardly along the shank portion 68e of the mandrel. This excess will generally be trimmed into the shape of a ring or band of plastic (12a) and may be removed by withdrawing mandrel 68 within its housing 69. The top surface 74 of the housing acts as a stripping surface or stripper member and since the mandrel moves from one side of this surface 74 to the opposite side thereof, the excess trimmed plastic 12a will be stripped from the mandrel, as illustrated in FIG. 5.

After the trimming operation has been completed, as above described, the molds 37 and 38 are opened. Upon opening the mold sections 37 and 38, the molded and trimmed article B is freed and may be ejected by any suitable means, such as, for example, an axially directed blast of air, as illustrated on FIG. 4.

After the formed bottle is ejected, the mold bed and its tube holding members 18 and 19 and partible mold sections 37 and 38 are immediately returned to their loading positions, as shown on FIG. 1, for starting the next forming cycle. Since the extruder 10 has been continuously producing a new length of plastic tubing 12, the machine is immediately ready to begin the next cycle to produce, in succession, the next plastic article.

In conjunction with FIGS. 7, 8 and 9, a modification of the invention will now be described. This includes a modified mandrel 75.

As shown on FIG. 7, the mold bed 13 carrying the closed mold sections 37 and 38, closed holding members 18 and 19, and separated cutting elements 24 and 25 are lowered to the blowing position and the mandrel 75 is but partially extended by its motor 70, so that the elongated head end portion 75a of the mandrel 75 of this embodiment enters into the tubing until it is within the molding cavity opening A'. In this position (FIG. 7), a blowing seal is accomplished inside the tubing 12 and pressurized blowing fluid is admitted through axial passage 73. Thus, the tubing is blown to the shape of the molding cavity A to the desired shape of hollow article B. Thereafter, the mandrel is extended further into the opening A' and into the bore of the article B to its fully extended position, as illustrated in FIG. 8. This movement is provided by relative axial movement between the closed mold sections 37 and 38 and mandrel 75. Obviously, this latter relative movement may be achieved by further lowering of mold bed 13, while holding mandrel 75 in status quo; or, by further extending mandrel 75 by its motor 70, or by a combination of both. In any case, the mandrel 75 is positioned as shown in FIG. 8 so that its annular shearing edge 75d is in the plane of the bottom faces 43 and 44 of the closed mold sections 37 and 38. The cutting elements 24 and 25 are then moved toward each other to trim the excess plastic 12a, as described previously, and form the end face of the open end of the article B. The mandrel 75, as shown on FIGS. 7–9, is relieved or recessed at an intermediate axial portion 75b so as to form a radial wall or ledge 75c joining the periphery of the head end portion 75a of the mandrel and define the annular shearing edge 75d. The mandrel is tapered along this relieved or recessed portion 75b, as shown. The trimmed plastic 12a upon shearing will distend inwardly into this relieved or recessed portion 75b of the mandrel and remain on the mandrel. Anytime after the container B is trimmed, as described, the mold sections 37 and 38, cutting elements 24 and 25 and holding members 18 and 19 may be separated (opened) by their respective motors, above described, to free the formed article B; whereupon, the article is ejected by an axial blast of air applied, preferably, through the axial passage 73 of the mandrel 75.

Thereafter, the trimmed plastic 12a is removed as follows. Internally of the shank portion 75e of mandrel 75 is provided one or more axial passages 76 communicating with an annular chamber 77. A plurality of radially directed nozzles 78 each communicate between the chamber 77 and the periphery of the mandrel 75 along its relieved portion 75b and in the proximity to the annular shearing edge 75d but behind the ledge 75c. After the cutting members 24 and 25 are separated, air or any suitable fluid may be supplied under pressure to the annular chamber 77 in the mandrel through a line connection 79 made to communicate internally of the mandrel housing 69 (not shown) with each of the axially disposed passages 76. This application of fluid pressure will provide two advantageous functions: (1) it will force the deformed excess plastic 12a outwardly into a ring or doughnut shape so that it may be easily stripped from the mandrel, according to the stripping manipulation described previously herein, and (2) it will also provide a coolant for circulation about the mandrel in proximity to the head end portion, which is the portion that will subsequently contact the next length of tubing on the next cycle, and thereby cool the mandrel to eliminate sticking of that tubing on the head end of the mandrel.

Obviously, the fluid may be circulated for emission from nozzles 78 throughout the forming cycle if need therefor should arise.

The just-mentioned application of pressurized fluid through the radialy directed nozzles 78 is illustrated in FIG. 9. Thereafter, the trimmed excess plastic is stripped from the mandrel 75 by withdrawing it within its housing 69 past the stripping member 74, similar to the illustration in FIG. 5 and according to the procedure described previously herein relating thereto.

Various modifications may be resorted to within the spirit and scope of the appended claims.

I claim:
1. In an apparatus for shaping and trimming blown hollow plastic articles from thermoplastic tubing, the combination of a partible mold closable to define a molding cavity provided with an opening at one end face of said mold, means for closing said mold about a portion of a length of thermoplastic tubing with an end portion of said tubing projecting out of said mold end face, a mandrel insertable into said tubing end, said mandrel having an annular recess formed on an intermediate portion thereof to define an annular shearing edge, means for inserting said mandrel into the molding cavity opening and aligning said annular shearing edge in the plane of said end face of the mold, a cutting element mounted for radial movemtnt relative to said mold toward and away from said mandrel along said plane of said mold end face and means for moving said cutting element radially inwardly across said annular shearing edge to sever said tubing, said mandrel having a plurality of radially directed nozzles opening in said annular recess in proximity to said annular shearing edge, and means connected to said nozzles internally of the mandrel for supplying fluid under pressure to said nozzles.

2. In an apparatus for shaping and trimming blown hollow plastic articles the combination of a pair of complementary mold sections mounted for movement toward and away from each other, said sections adapted, when moved toward each other, to close about a length of hollow tubing such that an excess portion of said tubing projects out of the mold and, when closed, will define a molding cavity having an opening at one end face of the mold from which said excess portion projects, a mandrel aligned for entrance into said opening and shaped at its outer end portion to define the internal bore of the opening of articles formed in said mold, said mandrel having an annular recess including a ledge terminating in a substantially right angle corner at the periphery of said mandrel at an intermediate point along its length to define an annular shearing edge, means for relatively moving said mold sections and said mandrel toward each other for inserting the outer end portion of the mandrel into the tubing in the opening of the molding cavity of the closed partible mold sections so as to align said annular shearing edge of the mandrel in the plane of said end face of the mold and maintain the internal bore of the tubing to finished size, a pair of complementary semicircular shearing blades mounted for movement toward and away from each other in a plane contiguous with said end face of the mold, means for moving said shearing blades toward each other and across the annular shearing edge on said mandrel to trim the plastic projecting out of the mold, means for applying fluid under pressure in a radial outwardly direction from the mandrel in said recess and in proximity to the said ledge, a stripper member aligned adjacent the mandrel and adapted to engage the trimmed plastic upon movement away from the mold opening, and a reciprocating motor operatively connected to the mandrel for retracting it past the stripper member to strip the trimmed plastic from the mandrel.

References Cited in the file of this patent

UNITED STATES PATENTS

| 2,340,162 | Whistler et al. | Jan. 25, 1944 |
| 2,349,177 | Kopitke | May 16, 1944 |
| 2,620,031 | Swift | Dec. 2, 1952 |
| 2,783,503 | Sherman | Mar. 5, 1957 |
| 2,787,023 | Hagen et al. | Apr. 2, 1957 |
| 2,810,934 | Bailey | Oct. 29, 1957 |
| 2,928,120 | Leghorn et al. | Mar. 15, 1960 |

FOREIGN PATENTS

| 1,029,586 | France | Mar. 11, 1953 |